(12) United States Patent
Van Mierloo et al.

(10) Patent No.: US 11,230,634 B2
(45) Date of Patent: Jan. 25, 2022

(54) UV AND HEAT STABLE FLAME-RETARDANT GLASS FILLED POLYMER COMPOSITION AND REINFORCED ARTICLES THEREFROM

(71) Applicant: SABIC GLOBAL TECHNOLOGIES B.V., Bergen op Zoom (NL)

(72) Inventors: Sarah Van Mierloo, Geleen (NL); Roland Van Giesen, Geleen (NL); Henrica Norberta Alberta Maria Steenbakkers-Menting, Geleen (NL); Rick Robert Emilie Bercx, Geleen (NL); Maud Corrina Willie Van Der Ven, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 83 days.

(21) Appl. No.: 16/615,556

(22) PCT Filed: Jun. 26, 2018

(86) PCT No.: PCT/EP2018/067150
§ 371 (c)(1),
(2) Date: Nov. 21, 2019

(87) PCT Pub. No.: WO2019/002315
PCT Pub. Date: Jan. 3, 2019

(65) Prior Publication Data
US 2020/0172707 A1 Jun. 4, 2020

(30) Foreign Application Priority Data

Jun. 26, 2017 (EP) ..................................... 17177783

(51) Int. Cl.
*C08K 13/02* (2006.01)
*C08K 5/00* (2006.01)
*C08L 23/12* (2006.01)

(52) U.S. Cl.
CPC ................ *C08K 13/02* (2013.01); *C08K 5/00* (2013.01); *C08L 23/12* (2013.01); *C08K 2201/014* (2013.01); *C08L 2201/02* (2013.01); *C08L 2201/08* (2013.01); *C08L 2205/025* (2013.01)

(58) Field of Classification Search
CPC ................................. C08K 13/02; C08L 23/12
See application file for complete search history.

(56) References Cited

U.S. PATENT DOCUMENTS

2017/0137613 A1   5/2017   Andrews et al.

FOREIGN PATENT DOCUMENTS

| EP | 0994978 B1 | 10/2004 |
| WO | 2009080281 A1 | 7/2009 |
| WO | 2016102278 A1 | 6/2016 |

OTHER PUBLICATIONS

International Search Report; International Application No. PCT/EP2018/067150; International Filing Date: Jun. 26, 2018; dated Jul. 31, 2018; 3 pages.
Written Opinion; International Application No. PCT/EP2018/067150; International Filing Date: Jun. 26, 2018; dated Jul. 31, 2018; 6 pages.

*Primary Examiner* — Arrie L Reuther
(74) *Attorney, Agent, or Firm* — Cantor Colburn LLP

(57) ABSTRACT

The invention relates to a polymer composition comprising a) a polypropylene resin; b) a mixture of light and heat stabilizing additives, comprising: i) a high molecular weight hindered tertiary amine light stabilizer (t-H M-HALS) having a weight average molecular weight of at least 1600 g/mol; ii) a low molecular weight hindered secondary amine light stabilizer (s-LM-HALS) is a fatty acid ester of 2,2,6,6-tetra-methyl-4-pipiridinol or a mixture of fatty acids thereof; and iii) an alkyl ester of a 3,5-dialkylated 4-hydroxyphenyl propionic acid or a n-alkyl-3,5-dialkylated 4-hydroxybenzoate; c) a mixture of antioxidant additives, comprising: i) a phenolic antioxidant; and ii) a phosphite additive; d) a flame-retardant composition, preferably comprising a mixture of: i) an organic phosphate compound; ii) an organic phosphoric acid; and iii) a zinc oxide; and e) a glass filler. The invention moreover relates to an article prepared therefrom.

21 Claims, No Drawings

UV AND HEAT STABLE FLAME-RETARDANT GLASS FILLED POLYMER COMPOSITION AND REINFORCED ARTICLES THEREFROM

CROSS REFERENCE TO RELATED APPLICATIONS

This application is a 371 National Stage application of PCT/EP2018/067150, filed Jun. 26, 2018, which is incorporated by reference in its entirety, and which claims priority to EP Application No. 17177783.2, filed Jun. 26, 2017.

TECHNICAL FIELD

The present invention relates to a flame-retardant glass filled composition suitable for use in reinforcing articles under conditions of exposure to heat and/or UV.

BACKGROUND

The invention relates to the field of flame-retardant glass reinforced polypropylene resin compositions providing heat resistance and resistance against ultraviolet radiation. Polypropylene resins deteriorate by, for example, heat, light and oxygen. UV degradation of polypropylene leads to a decline in mechanical properties concomitant with appearance changes (color, gloss, etc.). In particular the mechanical strength can be decreased and the polypropylene material can become colored. In order to prevent such deterioration of a polypropylene composition, there have been proposed a number of additives, used either alone or in various combinations. For polypropylene building and construction applications visual and mechanical changes are playing an important role.

Phenolic antioxidant (PAO) additives are widely employed to protect polypropylene against thermo-oxidative degradation during processing and in service conditions. Even though phenolic antioxidants offer good stabilization of polypropylene, most phenolic antioxidants exhibit the disadvantage of yellowing due to their oxidation to colored quinonoid compounds by air or $N_{Ox}$ gases. Furthermore, the phenolic antioxidants often exert only a limited effect when employed alone.

Therefore phenolic antioxidants have been used in combination with other compounds. For example, phenolic antioxidants have been used in combination with phosphites which are known to enhance the effectiveness of the phenolic antioxidants due to complementary and synergistic mechanisms of action (e.g. decomposition of hydroperoxides formed in the polymer at high temperature and in the presence of oxygen). Phenolic antioxidants have also been combined with various light stabilizers in order to achieve a high weather resistance. Examples of light stabilizers include benzophenone, benzotriazole and triazine type ultraviolet radiation absorbers, hindered hydroxy-benzoates and hindered amine compounds. In particular, the application of hindered amine light stabilizers (HALS) has been more and more increased since they are non-coloring, exert a high photo-stabilizing effect and also can improve the heat resistance.

However, providing adequate protection to polymer flame-retardant systems exposed to both severe ultraviolet radiation and high heat in service conditions still remains a challenge. For instance, applications such as building and construction are particularly demanding and require high performing stabilizing formulations to fulfil increased requirements in these applications.

In order to comply with severe heat and UV requirements, combinations of PAO with HALS have been used. However, light and heat stability are likely to be reduced due to an antagonistic interaction between possible acidic components generated by the applied phosphorus based flame-retardant systems and basic secondary hindered amines.

Introduced more than half a century ago, fiber-reinforced plastics are composite materials with a wide range of applications in industry, for example in the aerospace, automotive, chipping, building and construction industries. A reinforced article can comprise any combination of individual materials, for example a thermoplastic polymer (the matrix) in which fibers (reinforcing fiber) have been dispersed. A great diversity of organic fibers, including synthetic fibers such as polyamide, polytetrafluoroethylene, polyesters, natural fibers such as cotton, hemp, flax, jute and inorganic fibers, such as glass fibers and carbon fibers are often used as reinforcing fibers in composite materials.

The reinforced plastics industry has been using glass fibers in different forms for reinforcing polymer matrices to produce a diversity of products. Glass fibers are generally supplied as a plurality of continuous, very long filaments, and can be in the form of strands or bundles, rovings or yarns. A filament is an individual fiber of reinforcing material. A bundle is a plurality of bundled filaments. Yarns are collections of filaments or bundles twisted together. A roving refers to a collection of bundles/strands wound into a package.

A process for producing reinforced compositions is for example described in WO2009/080281. In this publication a process is described for producing a long glass fiber-reinforced thermoplastic polymer composition, which comprises the subsequent steps of: a) unwinding from a package of at least one continuous glass multifilament strand containing a sizing composition; b) applying an impregnating agent to said at least one continuous glass multifilament strand to form an impregnated continuous multifilament strand; c) applying a sheath of thermoplastic polymer around the impregnated continuous multifilament strand to form a sheathed continuous multifilament strand; and d) cutting the sheathed continuous glass multifilament strand into pellets. The pellets that are obtained with the above-described process comprise a multifilament glass (strand) that has the same length as the pellet.

SUMMARY

It is an object of the present invention to provide a reinforced composition which combines excellent UV resistance, flame retardant properties and (long term) heat resistance. It is a further object of the present invention to provide a flame-retardant reinforced composition having an improved UV resistance and improved heat resistance. It is a further object of the present invention to provide an article for outdoor use having an improved UV resistance and improved long term heat resistance and maintaining flame retardant properties during its service lifetime.

One or more of the above objects are achieved by a polymer composition according to the present invention comprising a polypropylene resin, a stabilizing additive mixture and an antioxidant mixture; said polymer composition and glass fibers form a composite composition (viz. the composition according to the invention).

The invention relates to a polymer composition comprising a) a polypropylene resin; b) a mixture of light and heat stabilizing additives, comprising: i) a high molecular weight hindered tertiary amine light stabilizer (t-HM-HALS) having a weight average molecular weight of at least 1600 g/mol; ii) a low molecular weight hindered secondary amine light stabilizer (s-LM-HALS) is a fatty acid ester of 2,2,6,6-tetra-methyl-4-pipiridinol or a mixture of fatty acids thereof; and iii) an alkyl ester of a 3,5-dialkylated 4-hydroxyphenyl propionic acid or a n-alkyl-3,5-dialkylated 4-hydroxybenzoate; c) a mixture of antioxidant additives, comprising: i) a phenolic antioxidant; and ii) a phosphite additive; d) a flame-retardant composition, preferably comprising a mixture of: i) an organic phosphate compound; ii) an organic phosphoric acid; and iii) a zinc oxide; and e) a glass filler; and f) optionally one or more additional additives.

In a first aspect, the invention relates to a composition according to claim 1, comprising: a) between 30 and 60 wt. % of a polypropylene resin; b) between 0.4 and 1.7 wt. % of a mixture of light and heat stabilizing additives, comprising: i) a high molecular weight hindered tertiary amine light stabilizer (t-HM-HALS) having a weight average molecular weight of at least 1600 g/mol; ii) a low molecular weight hindered secondary amine light stabilizer (s-LM-HALS) is a fatty acid ester of 2,2,6,6-tetra-methyl-4-pipiridinol or a mixture of fatty acids thereof; and iii) an alkyl ester of a 3,5-dialkylated 4-hydroxyphenyl propionic acid or a n-alkyl-3,5-dialkylated 4-hydroxybenzoate; c) between 0.01 and 1.0 wt. % of a mixture of antioxidant additives, comprising i) phenolic antioxidant; and ii) a phosphite additive; d) between 10 to 35 wt. % of a flame-retardant composition, preferably comprising a mixture of: i) an organic phosphate compound; ii) an organic phosphoric acid; and iii) a zinc oxide; and e) at least 30 wt. % of glass filler; wherein the wt. % are based on the total weight of the composition. In an embodiment, the composition comprises at most 59 wt. % of a polypropylene resin, such as at most 58 wt. % or 57 or even 55 wt. % of polypropylene resin. In an embodiment, the composition comprises at most 50 wt. %, or at most 45 wt. % or at most 40 wt. % of a polypropylene resin.

A process for providing the glass filled composition according to the invention comprising the steps of: a) providing at least one continuous strand of glass filaments; b) applying an impregnation agent to said continuous strand obtained in step a) to obtain an impregnated continuous strand; c) applying a sheath of the composition around the impregnated continuous strand obtained in step b) to form a sheathed continuous strand of glass filaments. Said sheathed continuous strand of glass filaments may be cut in a step d) to for pellets.

The composition according to the present invention may be in the form of a sheathed continuous strand or pellets having an axial direction; said strand or pellet comprising a core that extends in the axial direction and comprising a polymer sheath which has been applied around said core, wherein said core comprises a plurality of glass filaments, that extends in the axial direction.

The invention also relates to a reinforced article obtained or obtainable from molding said composition.

Corresponding embodiments are also applicable for the other aspects according to the present invention.

List of Definitions

The following definitions are used in the present description and claims to define the stated subject matter. Other terms not cited below are meant to have the generally accepted meaning in the field.

In the present description composite means: comprising at least two individual materials. The pellet according to the present invention may be regarded as being a composite pellet. In the present description pellet means: a rounded or tube-like solid object, such as a compressed mass of a substance.

In the present description filament means a thin thread or thread-like object or fiber;

glass filament means a filament made of glass; and multifilament means a plurality of filaments, e.g. in the form of a strand or bundle. In the present description bundle means: a plurality of filaments that is held together or wrapped up together.

DESCRIPTION OF EMBODIMENTS

In an embodiment, the composition further comprises f) one or more additional additives, preferably between 0 and 5 wt. %, being at most 5 wt. %, for example between 2 and 5 wt. % based on the weight of the composition.

In an embodiment, the combined amounts of a, b, c, d, and e amounts to 100 wt. % of the weight of the composition. In an embodiment, the combined amounts of a, b, c, d, e, and f amounts to 100 wt. % of the weight of the composition.

In an embodiment, the t-HM-HALS has a molecular weight (Mw) of between 1800 and 5000 g/mol, preferably between 2000 and 4000 g/mol. In an embodiment, the s-LM-HALS is a mixture of fatty acid esters of 2,2,6,6-tetra-methyl-4-pipiridinol.

In an embodiment, the mixture of light stabilizing additives comprises a n-alkyl-3,5-dialkylated 4-hydroxybenzoate, preferably n-hexadecyl 3,5-di-t-butyl-4-hydroxybenzoate.

In an embodiment, the flame-retardant composition comprises a mixture of an organic phosphate compound, an organic phosphoric acid and a zinc oxide; wherein the weight ratio of phosphate compound to phosphoric acid compound is from 1:0.01 to 1:2 and wherein the zinc oxide is present in an amount of from 2-10 wt. % based on the weight of the flame retardant composition.

In an embodiment, the flame-retardant composition is a mixture of piperazine pyrophosphate, phosphoric acid and zinc oxide, more preferably a mixture of 50-60 wt. % of piperazine pyrophosphate, 35-45 wt. % phosphoric acid and 3-6 wt. % of zinc oxide, all based on the total weight of the flame retardant composition.

In an embodiment, the amount of said t-HM-HALS is between 0.1 to 0.4 wt. %, preferably between 0.15 to 0.3 wt. %, such as 0.2 wt. %. based on the total weight of the composition. In an embodiment, the amount of said s-LM-HALS is between 0.2 and 0.8 wt. % such as 0.4 to 0.6 wt. % based on the total weight of the composition.

In an embodiment, the amount of said propionic acid or benzoate is between 0.1 and 0.5 wt. %, such as between 0.2 and 0.4 wt. % based on the total weight of the composition.

In an embodiment, the composition comprises a) between 30 and 59 wt. % of a polypropylene resin or between 30 and 50 wt. % of a polypropylene resin. In an embodiment, the composition comprises e) between 30 wt. % and 50 wt. % of glass filler, for example between 30 wt. % and 40 wt. % of glass filler. In an embodiment, the composition comprises between 20 to 30 wt. % of a flame-retardant composition.

In an embodiment, the polypropylene resin is a homopolymer of polypropylene.

In an embodiment, the polypropylene resin is a heterophasic polypropylene consisting of: i) a propylene-based matrix consisting of a propylene homopolymer and/or a propylene-α-olefin copolymer, said matrix consisting of at least 70 wt. %, preferably at least 90 wt. % of propylene and at most 30 wt. %, preferably at most 10 wt. % of α-olefin, based on the total weight of the propylene-based matrix, and ii) a dispersed ethylene-α-olefin copolymer comprising ethylene and at least one C3 to C10 α-olefin.

Phenolic Antioxidant (PAO)

The present thermoplastic composition comprises from 0.05-1 wt. % of a phenolic antioxidant additive. Said phenolic antioxidant additive may comprise one, two or more phenolic groups. These phenolic antioxidant additives may be sterically hindered phenolic additives. A non-limiting list of several different types of PAO are shown below.

In an embodiment, the phenolic antioxidant comprises an alkyl ester (i.e. propionic) group. For example, the phenolic antioxidant may comprise a C8-24 alkyl ester (i.e. propionic) group, preferably a C12-20 alkyl ester group, more preferably a C14-18 alkyl ester (i.e. propionic) group. The alkyl group is preferably a linear alkyl group. In other words, the phenolic antioxidant comprises an alkyl propionate group. Non-limiting examples of phenolic antioxidants with one phenolic group are the group of alkyl-3-(3,5-di-t-butyl-4-hydroxyphenyl) esters, such as $C_{1-20}$-alkyl-3-(3,5-di-t-butyl-4-hydroxyphenyl)propionates, preferably wherein said $C_{1-20}$-alkyl is methyl, octyl, isooctyl, tridecyl, tetradecyl, pentadecyl, hexadecyl, heptadecyl, octadecyl, and nonadecyl. More preferably, wherein said $C_{1-20}$-alkyl is $C_{8-18}$-alkyl, such as octyl, isooctyl, tridecyl, tetradecyl, pentadecyl, octadecyl. As a commercial example may be mentioned octadecyl-3-(3,5-di-tert-butyl-4-hydroxyphenyl) propionate (SONGNOX® 1076 available from Songwon or Irganox® 1076 available from BASF), Isooctyl-3-(3,5-di-t-butyl-4-hydroxyphenyl)propionate (Irganox® 1135 available from BASF).

Some other non-limiting examples of phenolic antioxidants with only one phenolic group per molecule are also 2-propylene acid, 2-isopentane6[(3-isopentane-2-hydroxy-5-isopentane-phenyl)-ethyl]-4-isopentanephenylester; [1,1': 3',1''-Terphenyl]-2'-ol, 5'-(octadecyloxy)-2,6-Di-phenyl-4-octadecyl-cyclo-oxy-phenol; 3-(3,5-Di-tert.-butyl-4-hydroxyphenyl)propionic acid, etc.

Non-limiting examples of the phenolic antioxidant with two phenolic groups comprising two C8-24 alkyl ester (i.e. propionic) groups, preferably C12-20 alkyl ester groups, more preferably C14-18 alkyl ester (i.e. propionic) groups. Examples thereof are, tri-ethylene-glycol-bis-3-(t-butyl-4-hydroxy-5-methyl-phenyl)-propionate (Irganox® 245 from BASF) and 1,6-hexane-diol-bis-3-(3,5-di-t-butyl-4-hydroxyphenyl)-propionate (Irganox® 259 from BASF).

Some other non-limiting examples of phenolic antioxidants with two phenolic groups per molecule are also 2,2'-Methylenebis (6-t-butyl-4-methylphenol); 2,2'-Methylenebis (4-ethyl-6-t-butylphenol); 2,2'-Isobutylidenebis (4,6-dimethylphenol).

Some phenolic antioxidants which comprise more than two phenolic groups per molecule are pentaerythritol tetrakis(3-(3,5-di-t-butyl-4-hydroxyphenyl)-propionate), tris(3, 5-di-t-butyl-4-hydroxybenzyl)isocyanurate, and 1,3,5-trimethyl-2,4,6-tris(3,5-di-t-butyl-4-hydroxybenzyl)benzene. Such antioxidants increase the processing and long-term thermal stability of the resin composition of the invention.

any of these phenolic antioxidants are commercially available.

Some examples include Irganox® 1010 (pentaerythritol tetrakis(3-(3,5-di-t-butyl-4-hydroxyphenyl)propionate, available from BASF), Irganox® 1330 (1,3,5-trimethyl-2,4, 6-tris(3,5-di-t-butyl-4-hydroxybenzyl)benzene, available from BASF), Hostanox® O3 (butyric acid, 3,3-bis(3-t-butyl-4-hydroxyphenyl)ethylene ester, available from Clariant), Irganox® 3114 (1,3,5-tris(3',5'-di-t-butyl-4'-hydroxybenzyl)-s-triazine-2,4,6-(1H,3H,5H)trione, available from BASF).

In an embodiment, the phenolic antioxidant is pentaerythritol tetrakis(3-(3,5-di-tert-butyl-4-hydroxyphenyl)propionate. In an embodiment, the phosphite additive is tris(2,4-di-tert-butylphenyl) phosphite or bis(2,4,6-tri-tert-butylphenyl) pentaerythritol diphosphite.

In an embodiment of said reinforced article, said article is an article suitable for building and construction, for example selected from the group consisting of roof panels, façades and construction beams.

The present composition comprises a novel mixture of additives, comprising a mixture of light and heat stabilizing additives and a mixture of antioxidant additives, at least one flame retardant additive and glass filler.

Polypropylene Resin

The polypropylene resin may be any type of polypropylene or mixtures of two or more thereof. As polypropylene may for example be used a homopolymer of propylene, a heterophasic polypropylene composition, being a heterophasic copolymer of propylene and ethylene and/or another alpha-olefin, or it may be a random polypropylene copolymer. In an embodiment, the polypropylene resin is a copolymer. The polypropylene resin may be a single grade of polypropylene but may also be a mixture of at least two different polypropylene grades.

In an embodiment, the polypropylene resin is a polypropylene homopolymer, for example having a melt flow index (MFI) that is at least 0.1 g/10 min for example at least 0.2 g/10 min, for example at least 1 g/1 0 min, or for example from 0.1 to 0.5 g/10 min, 1-10 g/10 min, or for example at least 20 g/10 min to for example at most 200 g/10 min, or for example at most 100 g/10 min.

In an embodiment, the polypropylene resin is a heterophasic polypropylene copolymer composition consisting of: i) a propylene-based matrix consisting of a propylene homopolymer and/or a propylene-α-olefin copolymer, said matrix consisting of at least 70 wt. %, preferably at least 90 wt. % of propylene and at most 30 wt. %, preferably at most 10 wt. % of α-olefin, based on the total weight of the propylene-based matrix, and ii) a dispersed ethylene-α-olefin copolymer comprising ethylene and at least one C3 to C10 alpha-olefin.

An example of a suitable heterophasic propylene copolymer is the commercially available compound from SABIC having a MFI of 70 g/10 min, a C2/C3 (viz. ethylene-propylene) rubber content (RC) of about 18 wt. % and a C2 content of the rubber phase (RCC2) of about 54 wt. %.

In an embodiment, the polypropylene resin is a random copolymer of propylene and ethylene, for example having a melt flow index (MFI) that is at least 0.1 g/10 min for example at least 0.2 g/10 min, for example at least 1 g/10 min, or for example from 0.1 to 0.5 g/10 min, 1-10 g/10 min, or for example at least 20 g/10 min to for example at most 200 g/10 min, or for example at most 100 g/10 min.

The amount of ethylene incorporated in the random copolymer of propylene and ethylene may for example be in the range of 0.1 to 10 wt. % based on the random copolymer of propylene and ethylene, for example in the range of 2 to 7 wt. %.

Mixture of Light and Heat Stabilizing Additives

This mixture of light and heat stabilizing additives comprises at least three different additives, each discussed in more detail below, being a low molecular weight HALS (s-LM-HALS), a high molecular weight HALS (s-LM-HALS) and a propionic acid or benzoate.

In an embodiment, the amount of said t-HM-HALS based on the total weight of the composition is between 0.1 to 0.4 wt. %, preferably between 0.15 to 0.3 wt. %, such as 0.2 wt %. In an embodiment, the amount of said s-LM-HALS based on the total weight of the composition is between 0.2 and 0.8 wt. % such as 0.4 to 0.6 wt. %. In an embodiment, the amount of said propionic acid or benzoate based on the total weight of the composition is between 0.1 and 0.5 wt. %, such as between 0.2 and 0.4 wt. %.

Hindered amine light stabilizers (HALS) are known; they are derivatives of 2,2,6,6-tetramethylpiperidine:

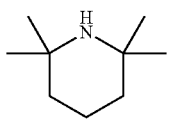

High Molecular Weight Hindered Tertiary Amine Light Stabilizer (t-HM-HALS)

With t-HM-HALS is meant a hindered amine light stabilizer having a high molecular weight (e.g. a molecular weight of equal to or above 1000 g/mol) and having a tertiary amine structure. With tertiary amine structure is meant a structure wherein the hindered amine is comprised in the backbone of the t-HM-HALS or wherein the hindered amine is substituted with an alkyl group. According to the present invention, the t-HM-HALS has a molecular weight of at least 1750 g/mol, preferably between 1800 and 5000 g/mol, more preferably between 2000 and 4000 g/mol. Examples of t-HM-HALS that are suitable for use in the present invention are the following.

An example of t-HM-HALS is 1,5,8,12-Tetrakis[4,6-bis (N-butyl-N-1,2,2,6,6-pentamethyl-4-piperidylamino)-1,3,5-triazin-2-yl]-1,5,8,12-tetraazadodecane having a $M_w$ of 2286 gram/mol. This compound is commercially available as for example Chimassorb 119; CAS no. 106990-43-6).

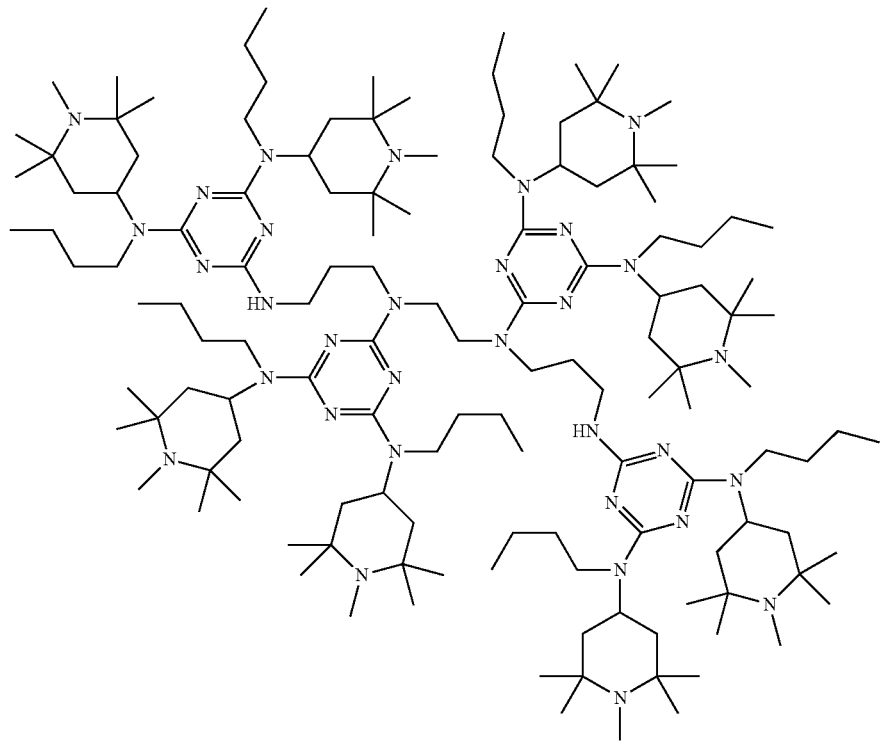 [SMILES: CCCCN(c1nc(NCCCN(CCN(CCCNc2nc(N(CCCC)C3CC(C)(C)N(C)C(C)(C)C3)nc(N(CCCC)C3CC(C)(C)N(C)C(C)(C)C3)n2)c2nc(N(CCCC)C3CC(C)(C)N(C)C(C)(C)C3)nc(N(CCCC)C3CC(C)(C)N(C)C(C)(C)C3)n2)c2nc(N(CCCC)C3CC(C)(C)N(C)C(C)(C)C3)nc(N(CCCC)C3CC(C)(C)N(C)C(C)(C)C3)n2)nc(N(CCCC)C2CC(C)(C)N(C)C(C)(C)C2)n1)C1CC(C)(C)N(C)C(C)(C)C1]

An example of a t-HM-HALS is butanedioic acid, dimethylester, polymer with 4-hydroxy-2,2,6,6-tetramethyl-1-piperidine ethanol having a $M_w$ of 3100-4000 gram/mol. This compound is commercially available as for example Tinuvin 622; CAS no. 65447-77-0).

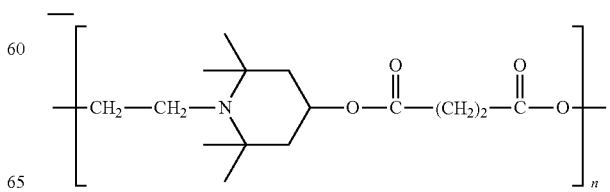

An example of a t-HM-HALS is 1,6-hexane diamine-N, N'-bis(2,2,6,6-tetramethyl-4-piperidinyl)-polymer with morpholino-2,4,6-trichloro-1,3,5-triazine having a Mw of 1700. This is commercially available as Cyasorb UV3529 from Cytec.

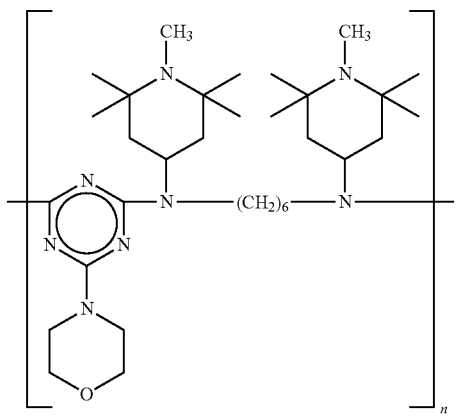

An example of a t-HM-HALS is 1,2,3,4-butanetetracarboxylic acid, polymer with β, β, β', β'-tetramethyl-2,4,8,10-tetraoxyspiro[5,5]undecane-3,9-diethanol, 1,2,2,6,6-pentamethyl-4-piperidinyl ester [CAS no. 115055-30-6] having an MW of approximately 2000. This is commercially available under several tradenames, such as ADK STAB LA63(P) from ADK Palmarole or Asahi Denka Kogyo, HALS 63 from ADK Palmarole or MARK LA63 from Asahi Denka Kogyo.

is an ester of 2,2,6,6-tetramethyl-4-pipiridinol and a fatty acid or a mixture of esters of 2,2,6,6-tetramethyl-4-pipiridinol and one or more fatty acids. Preferably, the s-LM-HALS is a mixture of esters of 2,2,6,6-tetramethyl-4-pipiridinol and optionally one or more fatty acids.

The s-LM-HALS may be added as such or may be added in the form of a s-LM-HALS in a carrier, for example in an amount of 50% s-LM-HALS and 50% carrier (e.g. polypropylene). Examples of s-LM-HALS that are suitable for use in the present invention are the following.

An example of s-LM-HALS is an alkyl ester (e.g. a stearate or palmitate ester) or mixtures of alkyl esters of 2,2,6,6-tetramethyl-pipiridinol which can e.g. be shown by the formula below. This compound may have a Mw of 423. This is commercially available under several tradenames, such as CYASORB UV3853 (from Cytec Industries), DASTIB 845 (from Chemko Chemaza A.S. Stazske), Hostavin 845 (from Clariant), Hals 845 (from ADK Palmarole), Sabostab UV91 50PP (Cas no. 86403-32-9 or CAS 24860-22-8).

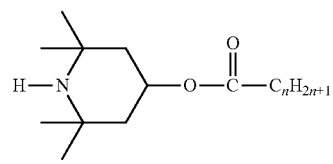

$n = 15 - 17$

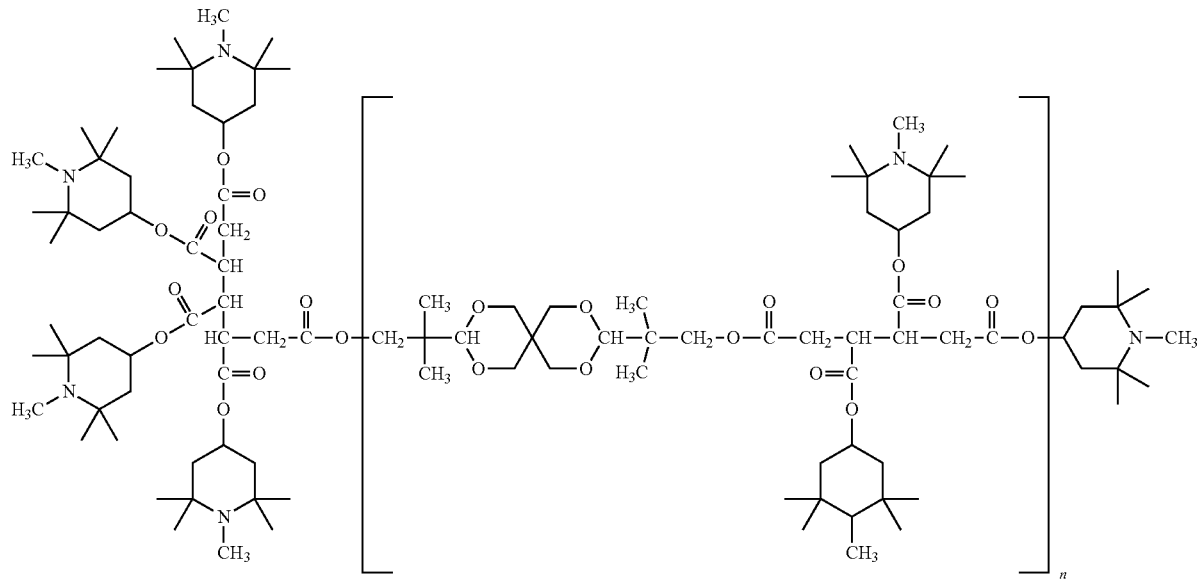

Low Molecular Weight Hindered Secondary Amine Light Stabilizer (s-LM-HALS)

With s-LM-HALS is meant a hindered amine light stabilizer having a low molecular weight (e.g. a molecular weight of below 1000 g/mol) and having a secondary amine structure. With secondary amine structure is meant a structure wherein the hindered amine has an attached hydrogen atom (N—H). According to the present invention the s-LM-HALS Alkyl Ester of a 3,5-dialkylated 4-hydroxyphenyl Propionic Acid The alkyl group of said alkyl ester is linear or branched and optionally substituted. Preferably, said alkyl group is tert-butyl. Preferably, the phenyl group is 3,5-disubstituted, more preferably with tert-butyl.

In an embodiment, the alkyl ester of a 3-alkylated 4-hydroxyphenyl propionic acid has a molecular weight of between 300 and 750 g/mol, such as approximately 530 g/ml. An example is octadecyl 3,5-di-tert-butyl-4-hydroxyphenyl proprionate (the stearaat ester of 3,5-di-tert-butyl-4-hydroxy-proprionic acid), also called dibutylhydroxyphenylpropionic acid stearyl ester, having a Mw of 531. This is commercially available as Irganox 1076; CAS no. 2082-79-3.

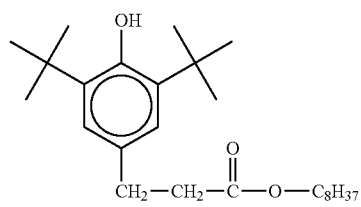

n-Alkyl-3,5-di-alkylated-4-hydroxybenzoate

The alkyl group of said alkyl ester is linear or branched and optionally substituted. Preferably, said alkyl group is tert-butyl. Preferably, the phenyl group is 3,5-disubstituted with tert-butyl. In an embodiment, the n-alkyl-3,5-di-t-butyl-4-hydroxybenzoate is n-hexadecyl 3,5-di-t-butyl-4-hydroxybenzoate (the palmitate ester of 3,5-di-tert-butyl-4-hydroxy-benzoic acid), having a Mw of 474. This is commercially available as Cyasorb 2908 or CYAGARD UV2908 both from Cytec industries; CAS no. 67845-93-6.

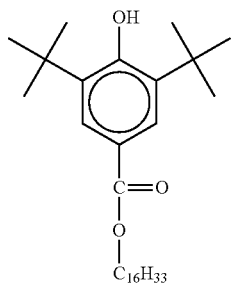

Mixture of Antioxidant Additives

This mixture of antioxidant additives comprises at least twee different additives (viz. a phenolic antioxidant and a phosphite additive), each discussed in more detail below. In an embodiment, the weight ratio of said phenolic antioxidant to said phosphite additive is between 1:2 and 2:1, such as 1:1.

Phenolic Antioxidant (PAO)

An example of such a phenolic antioxidant additive is pentaerythritol tetrakis(3-(3,5-di-tert-butyl-4-hydroxyphenyl)propionate) (also known commercially as Irganox 1010 or Evemox 10 or Anox 20 and present as 50% in Irganox B225 or Evemox B110 or Anox BB 011).

Phosphite Additive

Suitable phosphite additives are phosphites and phosphonites such as triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite (also known commercially as Irgafos 168 or as Everfos 168 or Alkanox 240 and forming 50% of the B225 additive), diisodecyl pentaerythritol diphosphite, distearylpentaerythritol diphosphite, bis(2,6-di-tert-butyl-4-methylphenyl) pentaerythritol diphosphite, bis(2,4,6-tri-tert-butylphenyl) pentaerythritol diphosphate (also known commercially as ADK STAB PEP-36), tetrakis(2,4-di-tert-butylphenyl) 4,4'-biphenylenediphosphonite, bis(2,4-di-tert-butyl-6-methylphenyl) ethyl phosphite.

Thiosynergists

In the antioxidant mix a thiosynergist may be present. The thiosynergist may, for example, be selected from the group consisting of dilauryl thiodipropionate, distearyl thiodipropionate, and dimyristyl thiodipropionate and ditridecyl thiodipropionate.

Flame Retardant Composition

The polypropylene compound further comprises a flame retardant composition comprising a mixture of an organic phosphate compound, an organic phosphoric acid compound and zinc oxide. For the avoidance of doubt the flame retardant composition is a halogen-free flame retardant composition.

In such mixture, the weight ratio of organic phosphate compound to phosphoric acid compound may be from 1:0.01 to 1:2. Preferably the weight ratio is from 1:1 to 1:2.

The organic phosphate compound in the mixture may be selected from piperazine pyrophosphate, piperazine polyphosphate and one or more combinations thereof. The phosphoric acid compounds in the mixture may be selected from phosphoric acid, melamine pyrophosphate, melamine polyphosphates, melamine phosphate and one or more combinations thereof. It is preferred that the phosphoric acid compound is melamine phosphate. The zinc oxide may be used in an amount of from 2-10 wt. %, more preferably from 3-6 wt. % based on the weight of the flame retardant composition.

The amount of flame retardant composition is from 10-35 wt. % based on the weight of the reinforced polypropylene composition. Higher amounts, such as from 20-35 wt. % may be required for applications that need to be compliant with a UL-94 5V rating. For ULS-94 V0 ratings lower amounts may suffice.

An example of a suitable flame retardant composition is a mixture of 50-60 wt. % of piperazine pyrophosphate, 35-45 wt. % phosphoric acid and 3-6 wt. % of zinc oxide, all based on the total weight of the flame retardant composition. This mixture is commercially available as e.g. ADK STAB FP-2200 available from Adeka Palmarole.

Additional Additives

The polypropylene compound may further contain additional additives like anti-oxidants, UV stabilizers, flame retardants, pigments (for example in the form of a color master batch (CMB), dyes, adhesion promoters like modified polypropylene, in particular maleated polypropylene, antistatic agents, mold release agents, nucleating agents and the like. The amount of such additional additives is for example at most 5 wt. % based on the weight of the reinforced composition (i.e. the pellets). For the avoidance of doubt it should be understood that the term "sheath" is to be considered as a layer that tightly accommodates the cores.

Glass Filler

A glass filler is present in the composition according to the present invention. It may be glass fibers. Examples of suitable glass fibers are long glass fibers (LGF) or short glass fiber (SGF).

The glass fibres used in the present invention typically have a diameter in the range of from 5 to 50 micrometer, preferably from 10 to 30 micrometer such as from 15 to 25 micrometer. A thinner glass fibre generally leads to higher aspect ratio (length over diameter ratio) of the glass fibres in the final product prepared from the glass fibre reinforced composition, yet thinner glass fibres may be more difficult to manufacture and/or handle. In the method according to the present invention it is preferred that the glass fibres originate from glass multifibre strands, also referred to as glass rovings.

Preferably, the glass multifibre strand(s) or rovings contain from 500 to 10000 glass filaments per strand, more preferably from 2000 to 5000 glass filaments per strand. The linear density of the glass multifibre strand preferably is from 1000 to 5000 tex, corresponding to 1000 to 5000 grams per 1000 meter. Preferably the linear density is from 1000-3000 tex. Usually the glass fibres are circular in cross section meaning the thickness as defined above would mean diameter. Rovings are generally available and well known to the skilled person. Examples of suitable rovings are the Advantex products designated for example as SE4220, SE4230 or SE4535 and available from Binani 3B Fibre Glass company, available as 1200 or 2400 tex, or TUFRov 4575, TUFRov 4588 available from PPG Fibre Glass. Most preferably rovings are used having a linear density of 3000 tex. These commercially available rovings contain glass fibres having a small amount of sizing composition applied thereon; typically the amount of such sizing is less than 2 wt. % based on the weight of the fibers.

In case a LGF is used, the glass fibers may be present in the composition as follows. A multifilament may be surrounded by a continuous sheath of the polymer composition according to the invention.

In order to improve the properties of moulded articles, the continuous strand is preferably treated with an impregnating agent before applying a sheath of thermoplastic polymer; said impregnating agent being considered as an additional additive in the present description. In an embodiment, as impregnation agent for impregnating the glass fibers a wax is used. In an embodiment, a low molecular weight hydrocarbon is used. Examples of impregnation agents, such as waxes and in particular low molecular weight hydrocarbons are known to a person skilled in the art. Specific examples thereof can be found in WO2009/080281 (for example on page 11 and 12) and the documents cited therein which examples are incorporated by reference. In an embodiment, said impregnating agent is non-volatile, has a melting point of at least 20° C. below the melting point of the thermoplastic matrix and is compatible with the thermoplastic polymer to be reinforced. In an embodiment, the impregnating agent has a viscosity (measured according to ISO 3104:1994) of from 2.5 to 100 cS at the application temperature.

In an embodiment, a sheath of thermoplastic polymer comprising said polypropylene resin, said mixture of light and heat stabilizing additives and said mixture of antioxidant additives, is applied around a multifilament. Preferably, said application is by wire-coating. The process of sheathing via wire-coating is done without wetting the fibers individually with a thermoplastic material but by forming a continuous outer sheath also called coating or skin of a thermoplastic material around the continuous multifilament strand surface. In an embodiment, the sheathed continuous strand of glass filaments obtained is cut into individual pellets comprising a core that extends in axial direction and surrounded by a polymer sheath. In an embodiment, said pellets have a length of between 5-25 mm, preferably 8-20 mm. The sheathed continuous strand is preferably cut or chopped into individual pellets or granules of desired length, for example about 12 mm. In an embodiment, these pellets the fibers are generally parallel to each other and have the same length as the pellets. Any suitable method known in the art, such as use of the devices mentioned in EP0994978B1 may be used in the present invention. In an embodiment of said strand or the pellet, said polymer sheath is at least substantially free of said filaments. In an embodiment of said strand or the pellet, said polymer sheath comprises less than 5 wt. % of said glass filament based on the total weight of the polymer sheath. In an embodiment of said strand or the pellet, said polymer sheath comprises less than 2 wt. % of filament based on the total weight of the polymer sheath. This ensures a structure of the pellet wherein the glass is in the core and there is hardly any glass in the thermoplastic sheath; allowing to obtain optimal visual performance of the reinforced articles produced therewith.

In an embodiment of said strand or the pellet, said strand or pellet comprises at least 20%, preferably at least 30% and at most 80% of glass filaments by weight of the total weight of said strand or pellet. This ensures sufficient physical properties, such as stiffness, of the reinforced articles produced therewith. In an embodiment of said strand or the pellet, the radius of the core is between 800 and 4000 micrometre. In an embodiment of said strand or the pellet, the thickness of the polymer sheath is between 500 and 1500 micrometre. This ensures sufficient physical properties of the reinforced articles produced therewith. In an embodiment of said strand or the pellet, the core comprises between 35 and 60% of the cross section area of the strand or pellet and the sheath comprises between 40 and 65% of the cross section area of the strand or pellet. In an embodiment of said strand or the pellet, the amount of polymer in the strand or pellet is between 20 and 80 wt. % of the total weight of the strand or pellet. This ensures sufficient physical properties of the reinforced articles produced therewith. In an embodiment of said strand or the pellet, said core comprises from 2000 to 5000 filaments. In an embodiment of said strand or the pellet, said filaments having a diameter from 5 to 50 microns. In an embodiment of said strand or the pellet, said filaments having a diameter from 10 to 30 microns. In an embodiment of said strand or the pellet, said filaments having a diameter from 15 to 25 microns. This ensures sufficient physical properties of the reinforced articles produced therewith.

In an embodiment a coupling agent (also called adhesion promoter) is present in the composition. The adhesion promoter preferably comprises a modified (functionalized) polymer and optionally a low molecular weight compound having reactive polar groups. Preference is further given to modified polymers containing groups deriving from polar compounds, in particular one or more selected from the group consisting of acid anhydrides, carboxylic acids, carboxylic acid derivatives, primary and secondary amines, hydroxyl compounds, oxazoline and epoxides, and also ionic compounds. Specific examples of such polar compounds are unsaturated cyclic anhydrides and their aliphatic diesters, and the diacid derivatives thereof. In particular, one can use maleic anhydride and compounds selected from $C_1$-$C_{10}$ linear and branched dialkyl maleates, C1-C10 linear and branched dialkyl fumarates, itaconic anhydride, C1-C10 linear and branched itaconic acid dialkyl esters, maleic acid, fumaric acid, itaconic acid and mixtures thereof. A preferred adhesion promoter is a maleic anhydride functionalized polypropylene, such as a propylene polymer grafted with maleic anhydride. A commercially available example for a suitable adhesion promoter is Exxelor® PO1020 obtainable from ExxonMobil Chemical. Suitable examples of anti-scratch additives are erucamide, oleamide and polydimethylsiloxane.

In an embodiment, the composition has a greyscale value of at least 3, preferably of at least 4 as determined according to the accelerated weathering tests as described herein in the section UV ageing.

Other variations to the disclosed embodiments can be understood and effected by those skilled in the art in practicing the claimed invention, from a study of the disclosure, and the appended claims. In the claims, the word "comprising" does not exclude other elements or steps, and the indefinite article "a" or "an" does not exclude a plurality. The scope of the present invention is defined by the appended claims. One or more of the objects of the invention are achieved by the appended claims.

EXAMPLES

The present invention is further elucidated based on the Examples below which are illustrative only and not considered limiting to the present invention.

As material for the sheath a polyolefin, viz. a polypropylene impact copolymer is used having a melt flow rate (measured according to ISO 1133:2005 at 230° C./2.16 kg) of 70 g/10 min and having a density of 0.905 g/cm3 (measured according to ISO 1183-1:2004).

As the glass fibre a commercially available roving suitable for coupling with polypropylene having a diameter of 19 micrometer and having a tex value (viz. the mass in grams per 1000 meters) of 3000 was used. As additives are added carbon black, an anti-oxidant, a UV stabilizer, a sizing composition suitable for polypropylene and a low Mw hydrocarbon.

Test Methods

Oven ageing was carried out with a forced air circulation oven for thermal (artificial) ageing provided by Binder, more specifically chamber FP 115 was used. Oven ageing experiments were performed with ISO-527/1B (2012) bars milled from injection molded isotropic plaques (270×310×3 mm) using Arburg 720S 3200-1300 equipment. After oven ageing, tensile testing according to ISO-527/1B (2012) and Charpy impact according to ISO 179 (2010) were carried out.

Accelerated UV ageing has been performed on injection molded samples (65*65*3.2 mm) according to PSA/Renault standard D27.1389/D27.1911 in an Atlas Weather-Ometer using the following conditions.

| Accelerated test equipment: | Atlas Weather-Ometer Ci65A |
|---|---|
| Test standard: | D27.1389/D27.1911 |
| Specification of test conditions: | |
| Light source: | Xenon arc |
| Filtering: | Borasilicate S inner and outer |
| Radiation intensity (regulated): | 0.55 W/m$^2$/nm (at 340 nm) |
| Chamber air temperature: | 50 ± 2° C. |
| Black panel temperature (regulated): | 70 ± 2° C. |
| Dry/wet cycle: | 102 minutes dry/18 minutes front water spray |
| Relative humidity (end of dry period): | 50 ± 5% |
| Light/dark cycle: | Continuous illumination |

Greyscale evaluation was carried out using DIN 54001 (1982), DIN 54002 (1982) or ISO105-A02 (1993) for visual contrast evaluation (greyscale) resulting in numerical ranking from 5 (no visual change) to 1 (very severe change). The higher the number, the better the result.

Color evaluation measurements were done by using a Macbeth 741 GL Multi-angle spectrophotometer, measuring L*, a*, b* values (CIE), using a 70° aspecular geometry, light source D65 and a 10° viewing angle. Colour measurements according to CIELAB (ASTM D6290-05) and ASTM E313.

Inventive Examples (I1 and I2) and Comparative Examples (C1 and C2)

For these examples compositions were prepared with one or more of the following components and using a Berstorff Extruder with an screw speed of 225 rpm, a throughput of 30 k/h and a specific energy of between 0.128 and 0.136 kWh/kg. Table 1 discloses the components used and the amounts used.

As polypropylene were used PP1: this is a heterophasic propylene copolymer commercially available from SABIC having a MFI of 70 g/10 min, SABIC PP513MNK10. As adhesion promotor Exxelor® PO1020 (API) was used. CMB is colour (black) master batch which is used to add colour (black) to the composition.

As t-HM-HALS was used 1,5,8,12-Tetrakis[4,6-bis(N-butyl-N-1,2,2,6,6-pentamethyl-4-piperidylamino)-1,3,5-triazin-2-yl]-1,5,8,12-tetraazadodecane (Chimassorb 119) (tHMHALS1). As s-LM-HALS were used bis(2,2,6,6,-tetramethyl-4-piperidyl)sebaceate (Tinuvin 770) (Comp.HALS—not according to the invention); or a mixture of alkyl esters of 2,2,6,6-tetramethyl-pipiridinol (Cyasorb 3853PP); which was added in the form of 50% of the s-LM-HALS compound and 50% of a polypropylene carrier (sLMHALS).

As alkyl ester of a 3,5-alkylated 4-hydroxyphenyl propionic acid was used octadecyl 3,5-di-tert-butyl-4-hydroxyphenyl proprionate (Irganox 1076) (HPPA1). As n-alkyl-3,5-dialkylated 4-hydroxybenzoate was used n-hexadecyl 3,5-di-t-butyl-4-hydroxybenzoate (Cyasorb 2908) (HB1).

As phenolic antioxidant was used pentaerythritol tetrakis (3-(3,5-di-tert-butyl-4-hydroxyphenyl)propionate)(Irganox 1010 or part of Irganox B225 (PAO1). As phosphite additives were used tris(2,4-di-tert-butylphenyl) phosphite (Irgafos 168 or part of Irganox B225) (PA1).

A glass roving having a diameter of 19 micron and a tex of 3000 was used (glass 1).

The pellets were manufactured using highly branched polyethylene wax (wax 1) as described in WO2009/080281.

As flame retardant composition was used (ADK STAB FP-2200)(FR1).

TABLE 1

Compositional details for comparative (C1 and C2) and inventive examples (I1 and I2)

| | Unit | C1 | C2 | I1 | I2 |
|---|---|---|---|---|---|
| PP1 | wt. % | 39.44 | 39.10 | 38.70 | 38.10 |
| FR1 | wt. % | 25 | 25 | 25 | 25 |
| glass1 | wt. % | 30.15 | 30.15 | 30.15 | 30.15 |
| wax1 | wt. % | 2.65 | 2.65 | 2.65 | 2.65 |
| AP1 | wt. % | 1.5 | 1.5 | 1.5 | 1.5 |
| CMB | wt. % | 0.6 | 0.6 | 0.6 | 0.6 |
| tHMHALS1 | wt. % | 0.06 | 0.2 | 0.2 | 0.2 |
| Comp. HALS | wt. % | 0.2 | 0.4 | 0 | 0 |
| sLMHALS* | wt. % | 0 | 0 | 0.8 | 1.2 |
| (s-LM-HALS) | | (0) | (0) | (0.4) | (0.6) |
| HPPA1 | wt. % | 0.2 | 0.2 | 0 | 0 |

TABLE 1-continued

Compositional details for comparative (C1 and C2) and inventive examples (I1 and I2)

|  | Unit | C1 | C2 | I1 | I2 |
|---|---|---|---|---|---|
| HB1 | wt. % | 0 | 0 | 0.2 | 0.4 |
| PAO1 | wt. % | 0.1 | 0.1 | 0.1 | 0.1 |
| PA1 | wt. % | 0.1 | 0.1 | 0.1 | 0.1 |
| Total | wt. % | 100 | 100 | 100 | 100 |

*SLMHALS is a masterbatch comprising 50% s-LM-HALS and 50% of carrier

TABLE 2

Appearance data after UV exposure according to D27.1389/D27.1911 test conditions

| Appearance evaluation after UV test (PSA/Renault D27.1389/D27.1911) | | | Composition | | | |
|---|---|---|---|---|---|---|
| | | | C1 | C2 | I1 | I2 |
| Greyscale evaluation (0°) | 0 | hrs | 5 | 5 | 5 | 5 |
| | 750 | hrs | 4 | 4.5 | 4.5 | 4.5 |
| | 1500 | hrs | 2.5 | 3.5 | 3 | 3 |
| | 2000 | hrs | 1 | 3 | 3 | 3 |
| | 2250 | hrs | 1 | 4 | 3.5 | 3.5 |
| | 2520 | hrs | | | | |
| | 3000 | hrs | 1 | 1 | 3.5 | 3.5 |
| | 3500 | hrs | 1 | 1 | 3.5 | 3.5 |
| | 4000 | hrs | 1 | 1 | 2 | 3 |
| | 4500 | hrs | 1 | 1 | 2 | 2.5 |
| | 5000 | hrs | 1 | 1 | 2 | 2.5 |
| Delta E | 750 | hrs | 4.05 | 3.34 | 3.83 | 3.77 |
| | 1500 | hrs | 6.17 | 3.98 | 4.34 | 4.23 |
| | 2000 | hrs | 13.36 | 4.52 | 4.7 | 4.67 |
| | 2250 | hrs | 15.95 | 4.86 | 4.96 | 4.85 |
| | 2520 | hrs | | | | |
| | 3000 | hrs | 17.07 | 7.28 | 5.82 | 5.47 |
| | 3500 | hrs | 15.35 | 10.17 | 6.47 | 6.17 |
| | 4000 | hrs | 13.45 | 14.58 | 7.41 | 6.65 |
| | 4500 | hrs | 11.92 | 18.12 | 8.92 | 7.75 |
| | 5000 | hrs | 11.04 | 20.58 | 10.75 | 8.54 |

From Table 2, it can be concluded that the greyscale values of the inventive examples are higher compared to the comparative examples. The delta E values for the inventive samples are lower vs comparative examples.

Also chemical changes due to photooxidation were determined using attenuated total reflection infrared spectroscopy (FT-IR/ATR). Infrared spectra were recorded using a Perkin Elmer 1740/Spectrum One instrument equipped with a diamond crystal, spectral resolution was set at 4 cm$^{-1}$. All spectra were normalized by setting the 1460 cm$^{-1}$ absorption to a value of 0.1. The absorption at 1772 cm$^{-1}$ was then used as a measure of degree of oxidation ($N_{ox}$) in the surface layer of the plaques. Degree of surface oxidation ($N_{ox}$) was determined in course of the accelerated UV-ageing and the values correspond to 11000 hours test duration. The results are shown in Table 3 below.

TABLE 3

FT-IR data regarding degree of surface oxidation.

| Example | $N_{ox}$ |
|---|---|
| C1 | >>0.025 |
| C2 | 0.0249 |
| I1 | 0.0052 |
| I2 | 0.0037 |

The invention claimed is:
1. A composition comprising:
   a. between 30 and 60 wt. % of a polypropylene resin;
   b. between 0.4 and 1.7 wt. % of a mixture of light and heat stabilizing additives, comprising:
      i. a high molecular weight hindered tertiary amine light stabilizer (t-HM-HALS) having a weight average molecular weight of at least 1600 g/mol;
      ii. a low molecular weight hindered secondary amine light stabilizer (s-LM-HALS) is a fatty acid ester of 2,2,6,6-tetra-methyl-4-pipiridinol or a mixture of fatty acids thereof; and
      iii. an alkyl ester of a 3,5-dialkylated 4-hydroxyphenyl propionic acid or a n-alkyl-3,5-dialkylated 4-hydroxybenzoate;
   c. between 0.01 and 1.0 wt. % of a mixture of antioxidant additives, comprising:
      i. a phenolic antioxidant; and
      ii. a phosphite additive;
   d. between 10 to 35 wt. % of a flame-retardant composition, optionally comprising a mixture of:
      i. an organic phosphate compound;
      ii. an organic phosphoric acid; and
      iii. a zinc oxide; and
   e. at least 30 wt. % of glass filler;
   wherein the wt. % are based on the weight of the composition.
2. The polymer composition according to claim 1, wherein the t-HM-HALS has a weight average molecular weight (Mw) of between 1800 and 5000 g/mol.
3. The polymer composition according to claim 1, wherein the s-LM-HALS is a mixture of fatty acid esters of 2,2,6,6-tetra-methyl-4-pipiridinol.
4. The polymer composition according to claim 1, further comprising f) an additional additives.
5. The polymer composition according to claim 1, wherein the mixture of light stabilizing additives comprises a n-alkyl-3,5-dialkylated 4-hydroxybenzoate.
6. The polymer composition according to claim 1, wherein the flame-retardant composition is present and comprises a mixture of an organic phosphate compound, an organic phosphoric acid and a zinc oxide; wherein the weight ratio of phosphate compound to phosphoric acid compound is from 1:0.01 to 1:2 and wherein the zinc oxide is present in an amount of from 2-10 wt. % based on the weight of the flame retardant composition.
7. The polymer composition according to claim 1, wherein the flame-retardant composition is present and is a mixture of piperazine pyrophosphate, phosphoric acid and zinc oxide.
8. The polymer composition according to claim 1, wherein the amount of said t-HM-HALS is between 0.1 to 0.4 wt. %, based on the total weight of the composition.
9. The polymer composition according to claim 1, wherein the amount of said s-LM-HALS is between 0.2 and 0.8 wt. % based on the total weight of the composition.
10. The polymer composition according to claim 1, wherein the amount of said propionic acid or benzoate is between 0.1 and 0.5 wt. %, based on the total weight of the composition.
11. The polymer composition according to claim 1, wherein the polypropylene resin is a homopolymer of polypropylene.
12. The polymer composition according to claim 1, wherein the polypropylene resin is a heterophasic polypropylene consisting of: i) a propylene-based matrix consisting of a propylene homopolymer and/or a propylene-α-olefin copolymer, said matrix consisting of at least 70 wt. % of propylene and at most 30 wt. % of α-olefin, based on the total weight of the propylene-based matrix, and ii) a dispersed ethylene-α-olefin copolymer comprising ethylene and at least one C3 to C10 α-olefin.

13. The polymer composition according to claim 12, wherein said matrix consisting of at least 90 wt. % of the propylene and at most 10 wt. % of the α-olefin, based on the total weight of the propylene-based matrix.

14. The polymer composition according to claim 1, wherein the phenolic antioxidant is pentaerythritol tetrakis (3-(3,5-di-tert-butyl-4-hydroxyphenyl)propionate and/or wherein the phosphite additive is tris(2,4-di-tert-butylphenyl) phosphite.

15. A reinforced article prepared from the composition according to claim 1.

16. The reinforced article according to claim 15, said article being an article suitable for building and construction.

17. The reinforced article according to claim 15, wherein said article is a roof panel, a façade, or a construction beam.

18. The polymer composition according to claim 1,
wherein the weight average molecular weight of the t-HM-HALS is between 2000 and 4000 g/mol;
wherein the s-LM-HALS is a mixture of fatty acid esters of 2,2,6,6-tetra-methyl-4-pipiridinol;
wherein the mixture of light stabilizing additives comprises a n-hexadecyl 3,5-di-t-butyl-4-hydroxybenzoate;
wherein the flame-retardant composition is present and comprises a mixture of an organic phosphate compound, an organic phosphoric acid and a zinc oxide;
wherein the weight ratio of phosphate compound to phosphoric acid compound is from 1:0.01 to 1:2;
wherein the flame-retardant composition is a mixture of 50-60 wt. % of piperazine pyrophosphate, 35-45 wt. % phosphoric acid and 3-6 wt. % of zinc oxide, all based on the total weight of the flame retardant composition;
wherein the amount of said t-HM-HALS is between 0.1 to 0.4 wt. % based on the total weight of the composition;
wherein the amount of said s-LM-HALS is between 0.2 and 0.8 wt. %, based on the total weight of the composition; and
wherein the amount of said propionic acid or benzoate is between 0.1 and 0.5 wt. %, based on the total weight of the composition.

19. The polymer composition according to claim 18, wherein the polypropylene resin is a homopolymer of polypropylene.

20. The polymer composition according to claim 1,
wherein the amount of said t-HM-HALS is between 0.15 to 0.3 wt. %, based on the total weight of the composition;
wherein the amount of said s-LM-HALS is 0.4 to 0.6 wt. % based on the total weight of the composition; and
wherein the amount of said propionic acid or benzoate is between 0.2 and 0.4 wt. %, based on the total weight of the composition.

21. A composition comprising:
a. between 30 and 50 wt.% of a heterophasic polypropylene;
b. between 0.4 and 1.7 wt.% of a mixture of light and heat stabilizing additives, comprising:
  i. a high molecular weight hindered tertiary amine light stabilizer (t-HM-HALS) having a weight average molecular weight of between 1600 and 5000 g/mol; wherein the amount of said t-HM-HALS is between 0.1 to 0.4 wt. %, based on the total weight of the composition;
  ii. a low molecular weight hindered secondary amine light stabilizer (s-LM-HALS) is a fatty acid ester of 2,2,6,6-tetra-methyl-4-pipiridinol or a mixture of fatty acids thereof;
wherein the amount of said s-LM-HALS is between 0.2 and 0.8 wt. % based on the total weight of the composition; and
  iii. an alkyl ester of a 3,5-dialkylated 4-hydroxyphenyl propionic acid or a n-alkyl-3,5-dialkylated 4-hydroxybenzoate; wherein the amount of said propionic acid or benzoate is between 0.1 and 0.5 wt. %, based on the total weight of the composition;
c. between 0.01 and 1.0 wt. % of a mixture of antioxidant additives, comprising:
  iv. a phenolic antioxidant; and
  v. a phosphite additive;
d. between 10 to 35 wt. % of a flame-retardant composition comprising a mixture of an organic phosphate compound, an organic phosphoric acid, and a zinc oxide; and
e. between 30 and 50 wt. % of glass fibers;
wherein the wt. % are based on the weight of the composition.

* * * * *